(12) United States Patent
Huang et al.

(10) Patent No.: US 7,207,730 B2
(45) Date of Patent: Apr. 24, 2007

(54) SMALL FORM FACTOR TRANSCEIVER

(75) Inventors: Nan Tsung Huang, Tu-Chen (TW); Chung Hsin Mou, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 573 days.

(21) Appl. No.: 10/683,051

(22) Filed: Oct. 9, 2003

(65) Prior Publication Data

US 2004/0116165 A1 Jun. 17, 2004

(30) Foreign Application Priority Data

Dec. 13, 2002 (TW) .............................. 91220203 U

(51) Int. Cl.
*G02B 6/36* (2006.01)

(52) U.S. Cl. ..................... 385/92; 455/575.1
(58) Field of Classification Search ................ 385/92; 455/575.1
See application file for complete search history.

(56) References Cited

U.S. PATENT DOCUMENTS

| | | | | |
|---|---|---|---|---|
| 5,673,172 A | * | 9/1997 | Hastings et al. ............ 361/685 |
| 6,149,444 A | * | 11/2000 | Shi et al. ...................... 439/95 |
| 6,350,063 B1 | | 2/2002 | Gilliland et al. | |
| 6,358,066 B1 | * | 3/2002 | Gilliland et al. ........... 439/76.1 |
| 6,461,058 B1 | | 10/2002 | Birch et al. | |
| 6,540,412 B2 | * | 4/2003 | Yonemura et al. ............ 385/88 |
| 6,661,565 B2 | * | 12/2003 | Shaw et al. ................. 359/297 |
| 6,824,315 B2 | * | 11/2004 | Irie ............................. 385/92 |
| 6,830,383 B2 | * | 12/2004 | Huang ......................... 385/92 |
| 2003/0021552 A1 | * | 1/2003 | Mitchell ...................... 385/92 |
| 2003/0138222 A1 | * | 7/2003 | Irie ............................. 385/92 |
| 2004/0037517 A1 | * | 2/2004 | Dair et al. ................... 385/92 |
| 2005/0018979 A1 | * | 1/2005 | Mizue et al. ................ 385/92 |

* cited by examiner

*Primary Examiner*—Ellen E. Kim
(74) *Attorney, Agent, or Firm*—Wei Te Chung

(57) ABSTRACT

A small form factor transceiver module (1) for connection to an outer communication interface includes a chassis (2), a metal shell (3), a signal-transferring subassembly (4), a printed circuit board (5) and a shielding housing (6). The signal-transferring subassembly is received in the chassis and electrically connects with the printed circuit board. The housing receives the printed circuit board therein, and is fixed to the chassis. The metal shell electrically engages with the shielding housing to provide protection against EMI.

19 Claims, 4 Drawing Sheets

SMALL FORM FACTOR TRANSCEIVER

BACKGROUND OF THE INVENTION

1. Field of the Invention

This invention relates generally to a small form factor (SFF) transceiver module and more particularly to a SFF transceiver module that provides protection against electromagnetic interference (EMI)

2. Description of the Related Art

A transceiver module is used with communications equipment, and connects to the communications equipment for bi-directional transmission of data between an outside communications interface and the communications equipment. A transceiver module can be an electrical transceiver module used in an electrical-electrical interface, or an optoelectrical transceiver module used in an optic-electrical interface.

Data transmission in communications networks at over 1 Gbps, require a high-speed transceiver modules. The high frequency circuits used in SFF transceiver modules at such high speeds require EMI shielding to protect the circuitry of other electronic equipment from EMI generated within the SFF transceiver module.

U.S. Publication No. 2001/0024551 discloses an optical transceiver module 1 mounted to a communications device. The optical transceiver module 1 includes a receiver optical sub-module 4, a transmitter optical sub-module 2, and a housing 6 to accommodate these modules. The housing 6 has a receptacle part 61 in which an optical connector is received. The receptacle part 61 can be made of conductive material or can be coated with a conductive film. However, when assembled, the receptacle part 61 of the transceiver module 1 extends out of an opening defined in the communications device to couple with an optical connector. A gap exists between the edge of the opening and the receptacle part 61, which allows seepage of harmful EMI, making a problem of the shielding of the transceiver module 1.

Therefore, there is a need for a SFF transceiver module, which has a complete EMI shielding.

SUMMARY OF THE INVENTION

An object of the present invention is to provide a SFF transceiver module, which is fully shielded to provide EMI shielding protection.

A small form factor transceiver module according to the present invention includes a chassis, a metal shell, a signal-transferring subassembly, a printed circuit board, and a shielding housing. The signal-transferring subassembly is received in the chassis and electrically connects with the printed circuit board. The shielding housing receives the printed circuit board therein, and is fixed to the chassis. The metal shell electrically engages with the shielding housing and the chassis to provide protection against EMI.

Other objects, advantages and novel features of the present invention will be drawn from the following detailed description of a preferred embodiment of the present invention, with attached drawings, in which:

DETAILED DESCRIPTION OF THE PREFERRED EMBODIMENT

Figure 1:
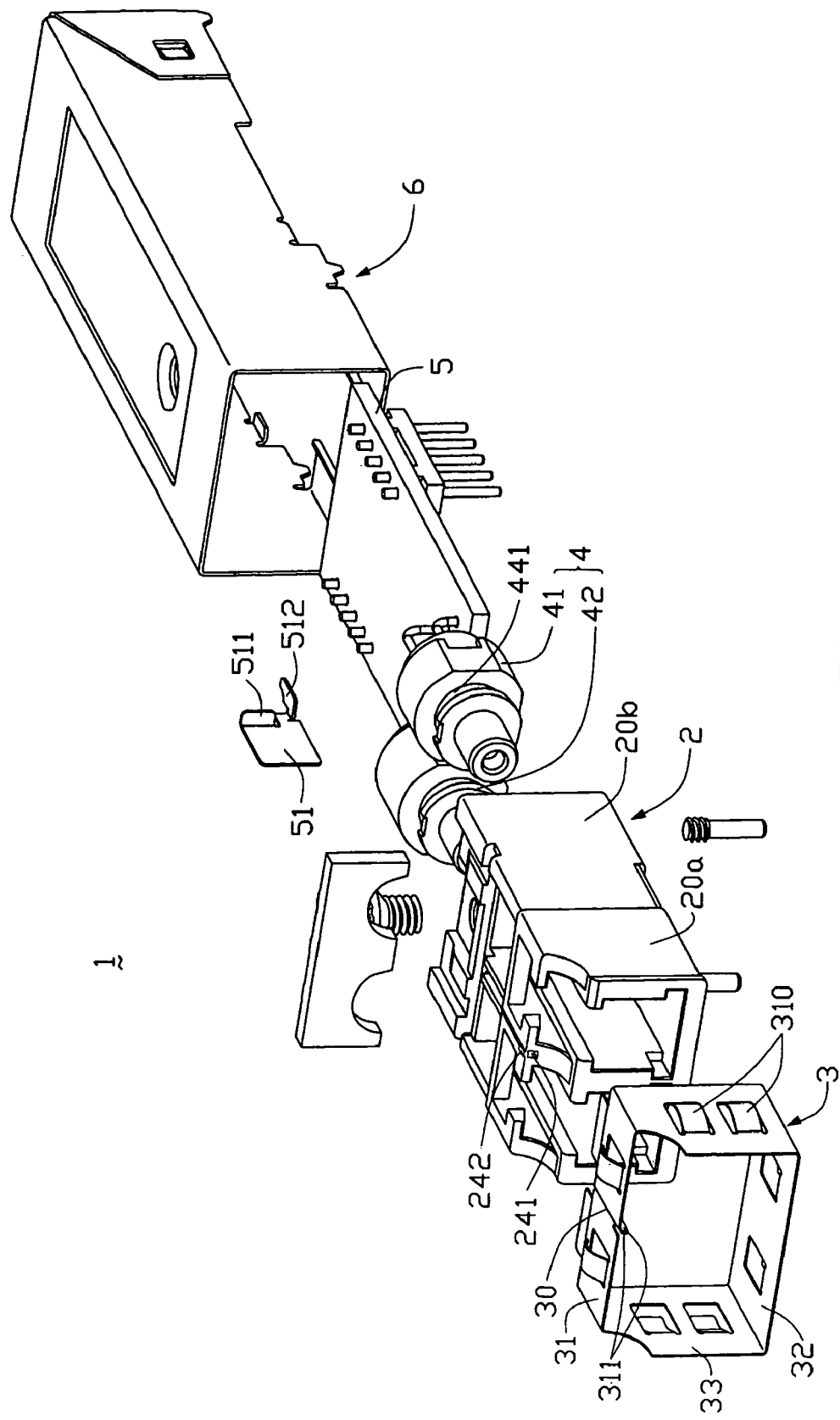
FIG. 1 is an exploded view of a SFF transceiver module from a top-side aspect.

Referring to FIG. 1, a SFF transceiver module 1 in accordance with the present invention comprises a chassis 2, a metal shell 3 enclosing the chassis 2, a signal transferring subassembly 4, a printed circuit board 5 and a shielding housing 6.

The metal shell 3 is made of a piece of metal, and is punched and bent into a rectangular jacket, which includes a top wall 31, a bottom wall 32 and two side walls 33. A seam 30 is located in a middle of the top wall 31, a pair of flaps 311 respectively curve inwardly and downwardly from two edges of the seam 30. A plurality of grounding tabs 310 extends outwardly from the top, bottom and side walls 31, 32, 33. Two rear sheets 313 (See FIG. 3) extend rearwardly from a rear end of the top wall 31.

Figure 2:
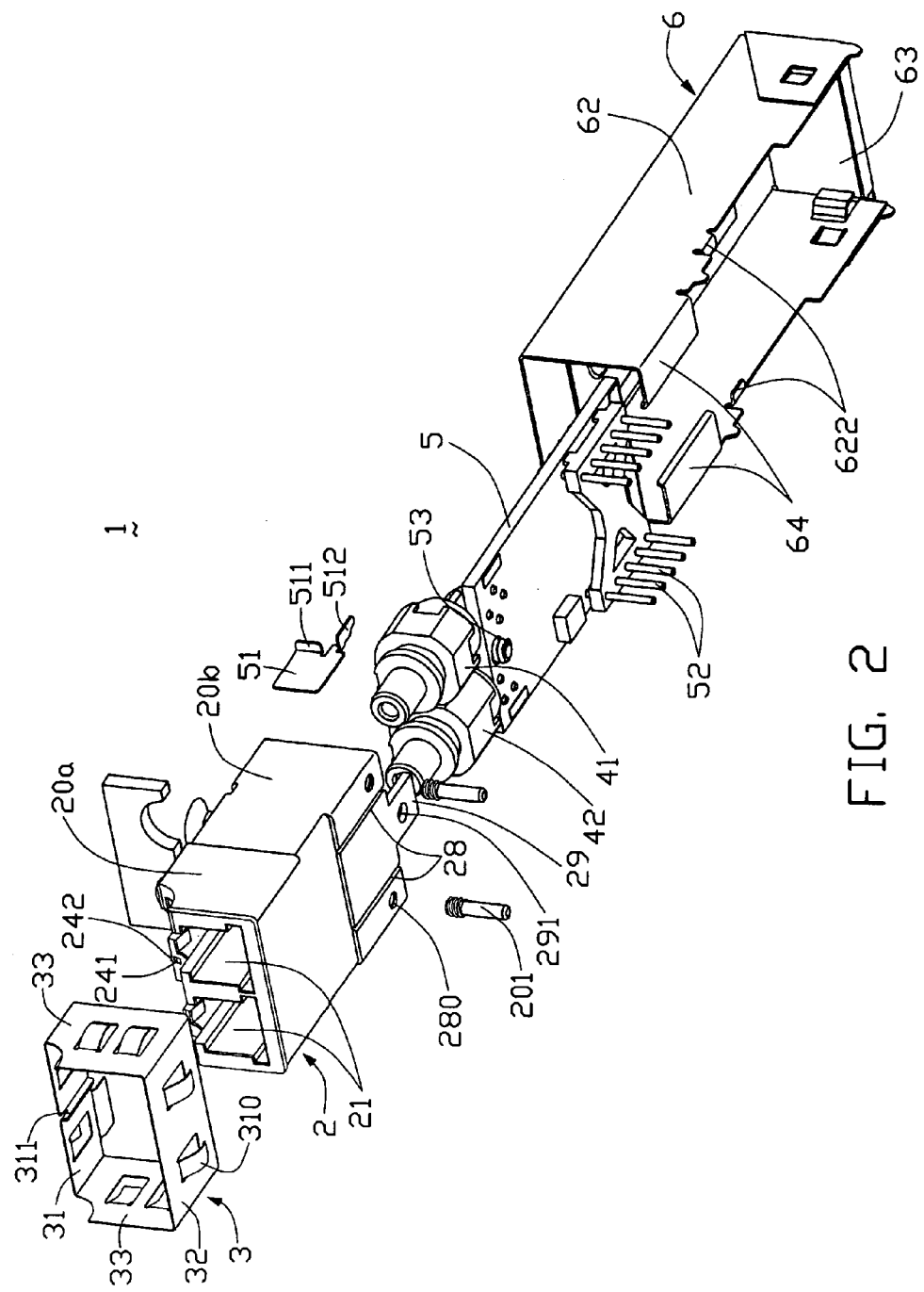
FIG. 2 is an exploded view of FIG. 1 from a bottom-side aspect.
Figure 3:
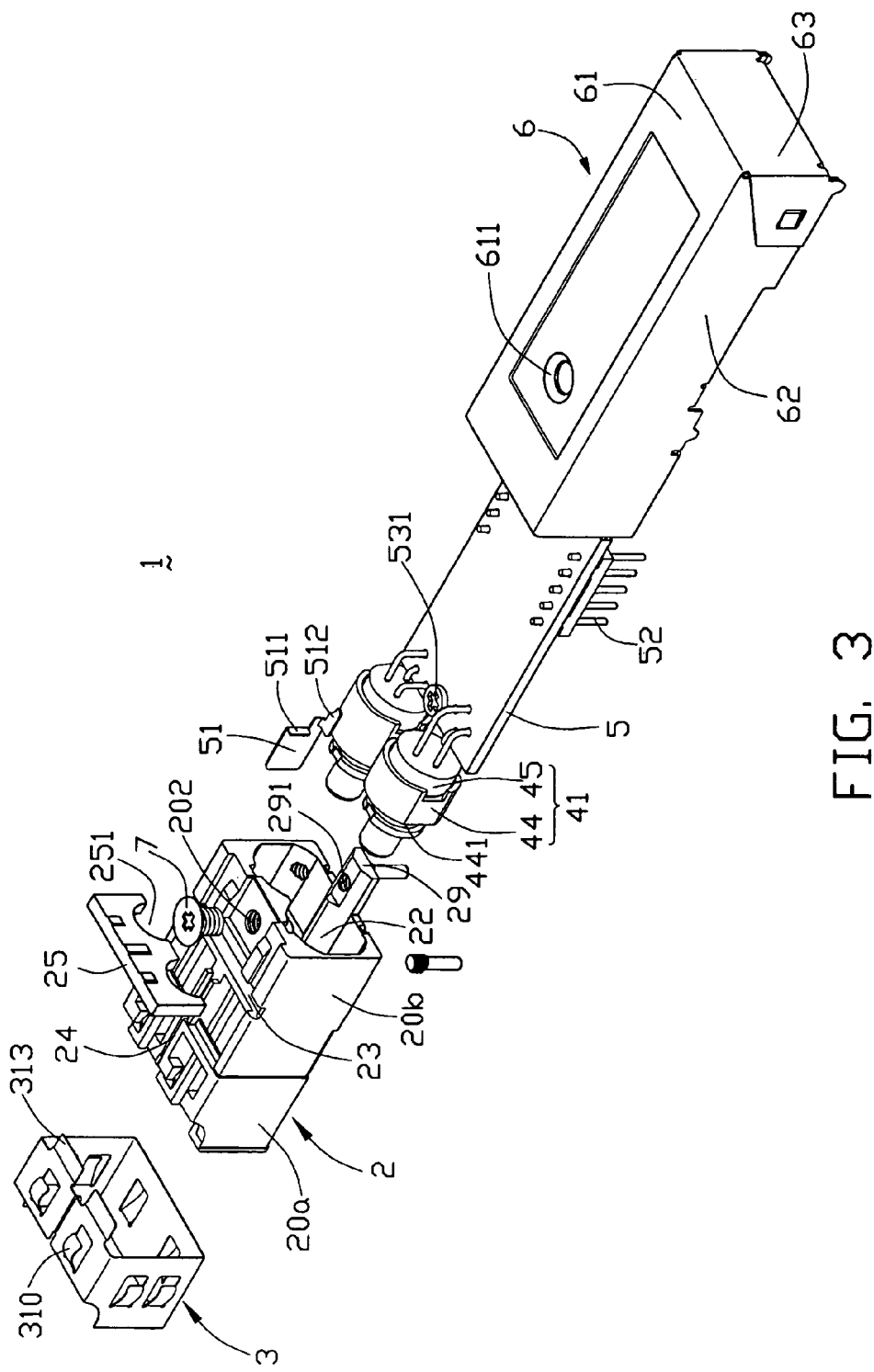
FIG. 3 is an exploded view of FIG. 1 from a different top-side aspect.

Referring to FIGS. 2 and 3, the chassis 2 is made of electrically conductive material for providing protection against EMI for the signal transferring subassembly 4 received therein. The chassis 2 includes a first section 20a and a second section 20b. The width of the first section 20a is a bit of less than that of the second section 20b. The chassis 2 defines two receiving openings 21 at a front end of the first section 20a for receiving optical fiber connectors (not shown) therein and at a rear end of the second section for receiving the signal transceiver subassembly therein. A channel 22 is defined in the chassis 2 and communicates with the two receiving openings 21. A rear projection 29 projects out of the second section 20b of the chassis 2, and defines a screw hole 291 therethrough. A screw hole 202 is defined through the top surface of second section 20b for corresponding to the screw hole 291. A positioning groove 23 is defined in a top surface of the chassis 2 and extends in a lateral direction. A receiving groove 24 is defined in the first section 20a of the chassis 2 in a longitudinal direction. A positioning plate 25 insertably mounts to the channel 22 through the positioning groove 23. Two semi-circular cut-outs 251 are defined at a bottom of the positioning plate 25. A block 242 is formed at a front of the receiving groove 24, and cooperates with the receiving groove 24 to form a receiving hole 241. Two guide slots 28 are arranged in parallel at the bottom surface (not labeled) of the second section 20b. Each guide slot 28 extends in a longitudinal direction. Two screw holes 280 are respectively defined at two sides of the guide slots 28 for engaging with two screws 201.

The signal transferring subassembly 4 is used to connect with the outer communications interface, and includes a light-transmitting unit 41 and a light-receiving unit 42. Each includes a plastic enclosure 44, a metal base 45 and an optoelectronic assembly (not labeled). A circular slot 441 is formed in the plastic enclosure 44 for engaging with the positioning plate 25 of the chassis 2.

Referring to FIG. 1, the printed circuit board 5 defines a through hole 53 (See FIG. 2) at a front end thereof. A grounding sheet 51 and a plurality of mounting pins 52 attach to the printed circuit board 5. The mounting pins 52 are attached at a rear end of the printed circuit board 5 and electrically connect with an outer device (not shown). Grounding circuits (not labeled) are defined on the printed circuit board 5 and electrically connect to the mounting pins 52, to make grounding contact with the outer device through the mounting pins 52. The light transmitting unit 41 and the light receiving unit 42 of the signal transferring subassembly 4 are mounted to and electrically connect with the printed circuit board 5 via connecting leads (not labeled). The grounding sheet 51 further includes a soldering tab 511 extending therefrom in a vertical direction, and a grounding tab 512 extending therefrom in a horizontal direction. The grounding sheet 51 is inserted between the light transmitting unit 41 and the light receiving unit 42. The soldering tab 511 is soldered to the base 45 of the light transmitting unit 41 and the grounding tab 512 is attached to a top surface (not labeled) of the printed circuit board 5 near the through hole 53.

Referring to FIGS. 2 and 3, the shielding housing 6 is in the shape of a hollow rectangular box, and includes a top wall 61, two side walls 62 extending downwardly therefrom, and a back wall 63 covering a rear portion of the side walls 62. A bottom plate 64 extends inwardly from two side edges of a front portion of each of the side walls 62, and upwardly bent at a free end thereof. A pair of retaining tabs 622 respectively extends inwardly from the side wall 62. A through hole 611 is defined through the top wall 61 for corresponding to the screw hole 202 of the chassis 2.

Figure 4:
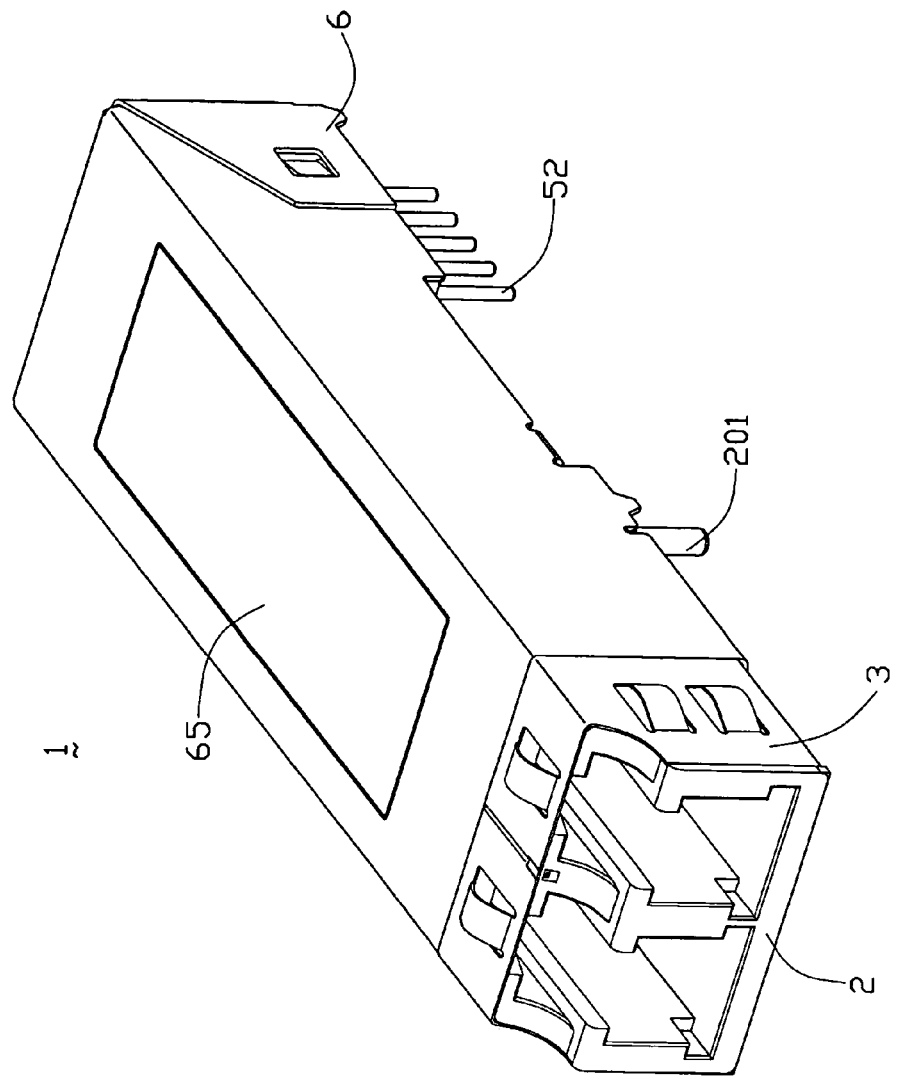
FIG. 4 is an assembled, perspective view of the SFF transceiver module of FIG. 1.

Referring also to FIG. 4, in assembly, the metal shell 3 encloses the first section 20a of the chassis 2, with the seam 30 aligning with the receiving groove 24 of the chassis 2 and the flaps 311 being received into the receiving groove 24 and the receiving hole 241. The block 242 prevents the metal shell 3 disengaging from the receiving groove 24. Thus, the metal shell 3 is held in secure contact with the chassis 2. The rear sheets 313 of the metal shell 3 overlap the top surface (not labeled) of the chassis 2. The flange 26 prevents the metal shell 3 from sliding frontward, and the step 27 in the bottom surface (not labeled) prevents the metal shell 3 from sliding backward.

Next, the light-transmitting unit 41 and light-receiving unit 42, having been fixed to the printed circuit board 5, are inserted into the channel 22 from the rear end of the second section 20b of the chassis 2. The positioning plate 25 is then inserted into the channel 22 through the positioning groove 23, and edges of the semi-circular cut-outs 251 are received into the circular slots 441 to fix the signal-transferring subassembly 4 to the chassis 2. A screw 531 is engaged in the mounting hole 53 of the printed circuit board 5 and the screw hole 291 in the rear projection 29 of the chassis 2. The grounding tab 512 of the grounding sheet 51, having been attached near the through hole 53, is then engaged by the screw 531. Since the screw 531 is made of a conductive material, it makes an electrical connection between the metal base 45 of the light transmitting unit 41, the grounding sheet 51, and the chassis 2.

Final, the shielding housing 6 is mounted to the chassis 2 and receives the printed circuit board 5 therein. Two free ends of the bottom plates 64 of the shielding housing 6 are respectively inserted into the guide grooves 28 of the chassis 2, to prevent the side walls 62 of the shielding housing from disengaging from the second section 20b of the chassis. The shielding housing 6 receives the rear sheets 313 of the metal shell 3 therein, to prevent the metal shell 3 from releasing from the shielding housing 6 or moving backwardly. A screw 7 passes through the through hole 611 in the top wall 61 of the housing 6 and then is screwed into the screw hole 202 of the chassis 2 to fix the housing 6 to the chassis 2. The retaining tabs 622 of the housing 61 are soldered to the bottom surface of the printed circuit board 5 and are electrically connected with grounding circuits (not shown) of the printed circuit board 5. Two metal screws 201 are screwed into the corresponding screw holes 280 in the bottom surface of the chassis 2, resulting in grounding contact with the chassis 2, the metal shell 3 and the housing 6. A label 65 is attached to the top wall 61 of the housing 6.

The SFF transceiver module of the present invention is not only useable as an optical-electrical interface, also used for electrical-electrical interface, with appropriate changes to the signal transferring subassembly 4.

Although the present invention has been described with specific terms, it should be noted that the described embodiments are not necessarily exclusive, and that various changes and modifications may be made thereto without departing from the scope of the present invention as defined in the appended claims.

The invention claimed is:

1. A small form factor transceiver module comprising:
a chassis;
a metal shell enclosing the chassis;
a signal transferring subassembly received in the chassis for connecting with an outer communications interface;
a printed circuit board electrically connecting with the signal transferring subassembly; and
a conductive housing being fixed to the chassis and receiving the printed circuit board therein, the housing comprising a top wall, two side walls extending from the top wall, a back wall partly covering the two side walls, and a pair of bottom plates each extending in a horizontal direction from a respective one of the side walls;
wherein the metal shell and the housing electrically engage with each other to provide protection against EMI (electromagnetic interference).

2. The small form factor transceiver module as claimed in claim 1, wherein the metal shell is a unitary sheet of metal.

3. The small form factor transceiver module as claimed in claim 2, wherein a receiving groove is defined in a top surface of the chassis, and the receiving groove is aligned with the seam of the metal shell.

4. The small form factor transceiver module as claimed in claim 1, wherein a seam is defined in the metal shell, and a pair of free ends projects inwardly from the seam.

5. The small form factor transceiver module as claimed in claim 4, wherein a receiving hole is formed at an end of the receiving groove.

6. The small form factor transceiver module as claimed in claim 5, wherein the free ends of the metal shell are configured to be inserted into the receiving groove and receiving hole of the chassis for preventing the metal shell from disengaging from the chassis.

7. The small form factor transceiver module as claimed in claim 1, wherein two guide grooves are defined in a bottom surface of the chassis.

8. The small form factor transceiver module as claimed in claim 7, wherein a free end of each bottom plate of the housing is received in a corresponding guide groove of the chassis for preventing the housing from disengaging from the chassis.

9. The small form factor transceiver module as claimed in claim 1, wherein the printed circuit board includes a plurality of mounting pins.

10. The small form factor transceiver module as claimed in claim 9, wherein the printed circuit board further includes grounding circuits that electrically connect with one of the mounting pins.

11. The small form factor transceiver module as claimed in claim 1, wherein the signal transferring subassembly includes a light transmitting unit and a light receiving unit.

12. The small form factor transceiver module as claimed in claim 11, wherein a grounding sheet is inserted between the light transmitting and light receiving units and electrically connects with the printed circuit board.

13. The small form factor transceiver module as claimed in claim 1, wherein the signal-transferring subassembly is an electrical connector.

14. The small form factor transceiver module as claimed in claim 1, wherein the chassis is electrically connected with the shielding housing and the metal shell.

15. The small form factor transceiver module as claimed in claim I, wherein the chassis includes a first section enclosed by the metal shell and a second section enclosed by the housing, and a width of the first section is less than that of the second section.

16. The small form factor transceiver module as claimed in claim 1, wherein at least one sheet projects rearwardly from the metal shell and is received beneath the housing for preventing the metal shell disengaging from the housing.

17. The small form factor transceiver module as claimed in claim 1, wherein a plurality of grounding tabs extends outwardly from the metal shell.

18. A transceiver module comprising:
a chassis;
a metallic shell enclosing a front portion of the chassis;
a signal transferring subassembly received in the chassis;
a printed circuit board connected to a rear portion of the signal transferring subassembly;
a metallic shielding housing enclosing a rear portion of the chassis and the printed circuit board; and
a step formed between the front portion and the rear portion;
the metallic shell including a rear sheet downwardly offset from a plane of the metallic shell, said rear sheet received in the step and under a front portion of the metallic shielding housing so as to restrain the metallic shell from moving relative to the chassis.

19. The transceiver module as claimed in claim 18, wherein the metallic shell further includes a flap receiveably engaged in a receiving groove formed in an upper face of the chassis.

* * * * *